(12) United States Patent
Veeramani et al.

(10) Patent No.: US 10,791,373 B2
(45) Date of Patent: Sep. 29, 2020

(54) GENERATING 2D VIDEO FROM 360 VIDEO

(71) Applicant: Intel Corporation, Santa Clara, CA (US)

(72) Inventors: Karthik Veeramani, Hillsboro, OR (US); Rajneesh Chowdhury, Portland, OR (US); Jill Boyce, Portland, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 3 days.

(21) Appl. No.: 15/858,320

(22) Filed: Dec. 29, 2017

(65) Prior Publication Data

US 2019/0045268 A1 Feb. 7, 2019

(51) Int. Cl.

| | |
|---|---|
| *H04N 21/4728* | (2011.01) |
| *H04N 5/232* | (2006.01) |
| *G06T 11/00* | (2006.01) |
| *H04N 21/438* | (2011.01) |
| *H04N 21/81* | (2011.01) |
| *H04N 21/44* | (2011.01) |
| *G06T 3/40* | (2006.01) |
| *H04N 21/258* | (2011.01) |
| *H04N 21/25* | (2011.01) |
| *H04N 21/2543* | (2011.01) |

(52) U.S. Cl.
CPC ....... *H04N 21/4728* (2013.01); *G06T 3/4038* (2013.01); *G06T 11/00* (2013.01); *H04N 5/23238* (2013.01); *H04N 21/25* (2013.01); *H04N 21/251* (2013.01); *H04N 21/252* (2013.01); *H04N 21/258* (2013.01); *H04N 21/25435* (2013.01); *H04N 21/25825* (2013.01); *H04N 21/25833* (2013.01); *H04N 21/25891* (2013.01); *H04N 21/4383* (2013.01); *H04N 21/44* (2013.01); *H04N 21/816* (2013.01); *H04N 21/8146* (2013.01)

(58) Field of Classification Search
None
See application file for complete search history.

(56) References Cited

U.S. PATENT DOCUMENTS

| | | | | |
|---|---|---|---|---|
| 2014/0366066 | A1* | 12/2014 | Ramakrishnan ... | H04N 21/4826 725/46 |
| 2016/0301862 | A1* | 10/2016 | Rantakokko ............ | G06F 3/011 |
| 2016/0353056 | A1* | 12/2016 | Cullen ............... | G06K 9/00221 |

(Continued)

OTHER PUBLICATIONS

U.S. Appl. No. 15/476,989, entitled MV/Mode Prediction, ROI-Based Transmit, Metadata Capture, and Format Detection for 360 Video, filed Apr. 1, 2017, 162 pages.

(Continued)

*Primary Examiner* — Justin E Shepard
(74) *Attorney, Agent, or Firm* — Green, Howard & Mughal LLP.

(57) ABSTRACT

A semiconductor package apparatus may include technology to aggregate region of interest information for omni-directional video content from two or more sources, select video information from the omni-directional video content based on the aggregated region of interest information, and generate one or more two-dimensional videos based on the selected video information. Other embodiments are disclosed and claimed.

20 Claims, 10 Drawing Sheets

(56) References Cited

U.S. PATENT DOCUMENTS

2017/0123614 A1\* 5/2017 Perlegos ............ H04N 21/2187
2017/0345205 A1\* 11/2017 Lai ........................ G06T 15/205

OTHER PUBLICATIONS

Jill Boyce et al, "HEVC Additional Supplemental Enhancement Information", Joint Collaborative Team on Video Coding (JCT-VC) of ITU-T SG 16 WP 3 and ISO/IEC JTC 1/SC 29/WG 11, 27th Meeting, Mar. 31-Apr. 7, 2017, Hobert, AU, 27 pages.

\* cited by examiner

GENERATING 2D VIDEO FROM 360 VIDEO

TECHNICAL FIELD

Embodiments generally relate to video systems. More particularly, embodiments relate to generating two-dimensional (2D) video from 360 video.

BACKGROUND

In three hundred sixty (360) degree video, which is also known as 360 video, omnidirectional video, panoramic video, immersive video, or spherical video, video recordings may be taken from many directions simultaneously using an omnidirectional camera or a collection of cameras (e.g., covering a range of 360 degrees). In playback, the viewer may select a viewing direction or viewport for viewing among any of the available directions. In compression/decompression (codec) systems, compression efficiency, video quality, and computational efficiency may be important performance criteria. These criteria may also be an important factor in the dissemination of 360 video and the user experience in the viewing of such 360 video.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
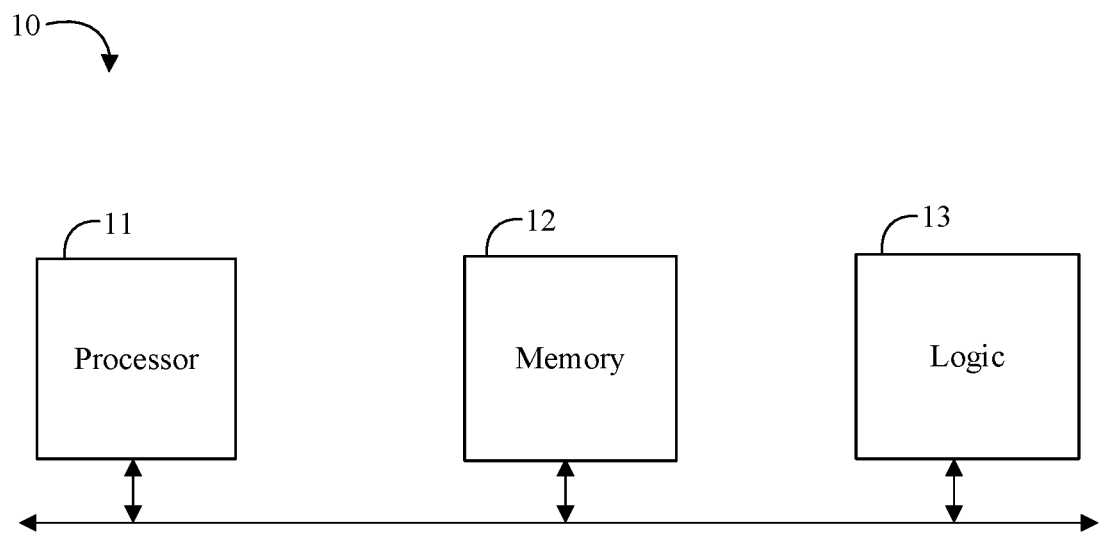
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to aggregate region of interest information for omni-directional video content (e.g., a 360 video) from two or more sources, select video information from the omni-directional video content based on the aggregated region of interest information, and generate one or more 2D videos based on the selected video information. In some embodiments, the logic 13 may be further configured to gather region of interest information from at least one of a content generator and a content consumer (e.g., crowd-sourced information). In some embodiments, the logic 13 may be further configured to cluster the aggregated region of interest information to select the video information from the omni-directional video content.

The system 10 may select either the one or more 2D videos or the omni-directional video content for distribution to a content consumer. For example, the logic 13 may be further configured to determine one or more parameters related to a content consumer, and select between the omni-directional video content and the one or more 2D videos for distribution to the content consumer based on the determined one or more parameters. In some embodiments, the logic 13 may also be configured to monitor the one or more parameters related to the content consumer, and switch between the omni-directional video content and the one or more 2D videos based on a change in the one or more parameters. For example, the one or more parameters may include a parameter related to one or more of a content consumer selection, prior information related to a content consumer, prior information related to a consumption device, a consumption device capability, bandwidth availability, a consumption device change, and an angle of view between a content consumer and a content consumption device. In some embodiments, machine learning may be applied to fine tune the parameters based on past history.

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, aggregating region of interest information for omni-directional video content from two or more sources, selecting video information from the omni-directional video content based on the aggregated region of interest information, generating one or more 2D videos based on the selected video information, etc.).

Figure 2:
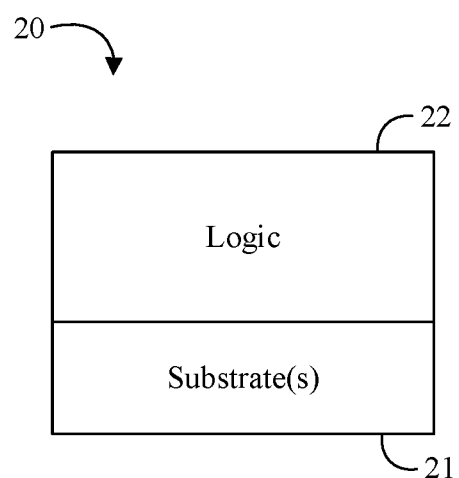
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates may be configured to aggregate region of interest information for omni-directional video content from two or more sources, select video information from the omni-directional video content based on the aggregated region of interest information, and generate one or more 2D videos based on the selected video information. In some embodiments, the logic 22 may be further configured to gather region of interest information from at least one of a content generator and a content consumer (e.g., crowd-sourced information). In some embodiments, the logic 22 may be further configured to cluster the aggregated region of interest information to select the video information from the omni-directional video content. For example, the logic 22 may be further configured to determine one or more parameters related to a content consumer, and select between the omni-directional video content and the one or more 2D videos for distribution to the content consumer based on the determined one or more parameters. In some embodiments, the logic 22 may also be configured to monitor the one or more parameters related to the content consumer, and switch between the omni-directional video content and the one or more 2D videos based on a change in the one or more parameters. For example, the one or more parameters may include a parameter related to one or more of a content consumer selection, prior information related to a content consumer, prior information related to a consumption device, a consumption device capability, bandwidth availability, a consumption device change, and an angle of view between a content consumer and a content consumption device. In some embodiments, machine learning may be applied to fine tune the parameters based on past history. In some embodiments, the logic 22 coupled to the one or more substrates 21 may include transistor channel regions that are positioned within the one or more substrates.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages. The illustrated apparatus 20 includes one or more substrates 21 (e.g., silicon, sapphire, gallium arsenide) and logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
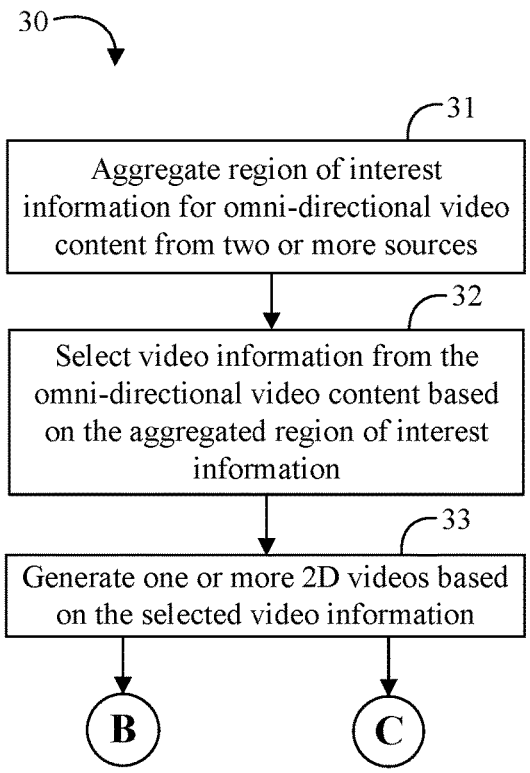
FIGS. 3A to 3C are flowcharts of an example of a method of generating video according to an embodiment.
Figure 3B:
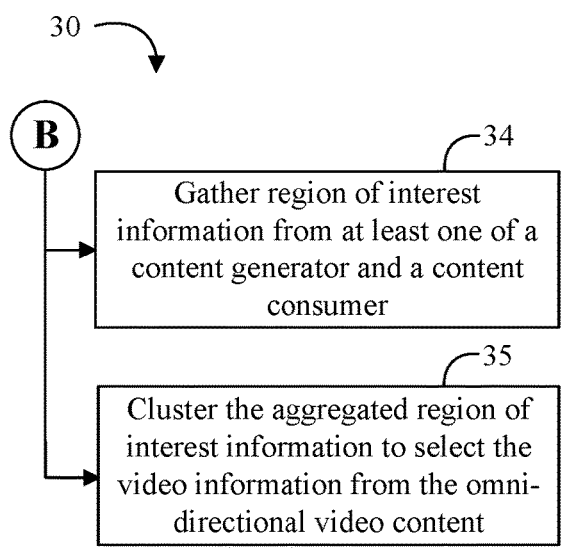
Figure 3C:
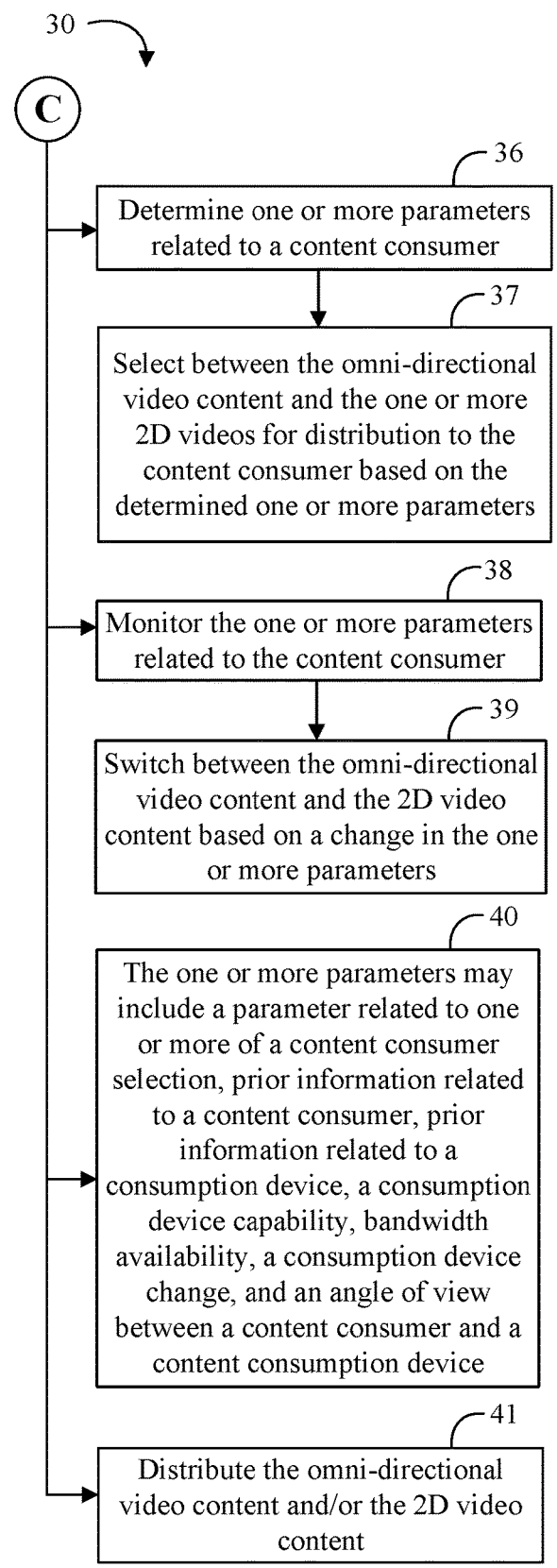

Turning now to FIGS. 3A to 3C, an embodiment of a method 30 of generating video may include aggregating region of interest information for omni-directional video content from two or more sources at block 31, selecting video information from the omni-directional video content based on the aggregated region of interest information, at block 32, and generating one or more 2D videos based on the selected video information at block 33. Some embodiments of the method 30 may also include gathering region of interest information from at least one of a content generator and a content consumer at block 34 (e.g., crowd-sourced information). Some embodiments of the method 30 may also include clustering the aggregated region of interest information to select the video information from the omni-directional video content at block 35.

Some embodiments of the method 30 may also include determining one or more parameters related to a content consumer at block 36, and selecting between the omni-directional video content and the one or more 2D videos for distribution to the content consumer based on the determined one or more parameters at block 37. For example, the method 30 may also include monitoring the one or more parameters related to the content consumer at block 38, and switching between the omni-directional video content and the one or more 2D videos based on a change in the one or more parameters at block 39. In some embodiments, the one or more parameters may include a parameter related to one or more of a content consumer selection, prior information related to a content consumer, prior information related to a consumption device, a consumption device capability, bandwidth availability, a consumption device change, and an angle of view between a content consumer and a content consumption device at block 40. Some embodiments of the method 30 may also include distributing the omni-directional video content and/or the one or more 2D videos at block 41. Some embodiments of the method 30 may also include applying machine learning to fine tune the parameters based on past history.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Figure 4:
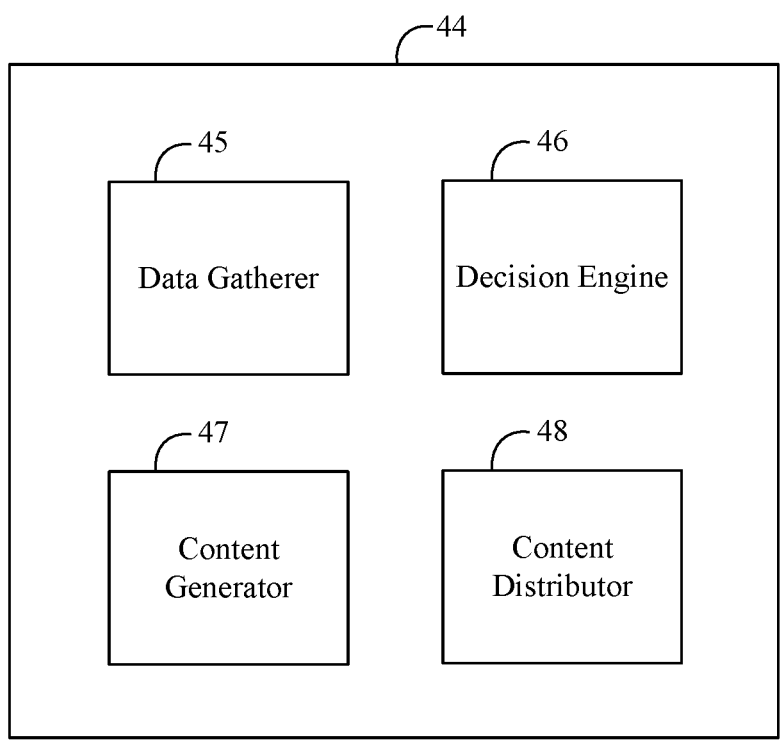
FIG. 4 is a block diagram of an example of a video generator apparatus according to an embodiment.

Turning now to FIG. 4, some embodiments may be physically or logically arranged as one or more modules. For example, an embodiment of a video generator apparatus 44 may include a data gatherer 45, a decision engine 46, a content generator 47, and a content distributor 48. The data gatherer 45 may include technology to aggregate region of interest information for 360 video content from two or more sources. For example, the data gatherer 45 may include technology to gather region of interest information from at least one of a content generator and a content consumer (e.g., to crowd source the region of interest information and/or points of interest information from two or more content consumers). With crowd sourcing capability, region of interest may be gathered by the data gatherer 45 across multiple content consumers as well as multiple content generators dynamically to identify the best 2D portions. The decision engine 46 may include technology to select video information from the 360 video content based on the aggregated region of interest information from the data gatherer 45. For example, the decision engine may include technology to cluster the aggregated region of interest information to select the video information from the omni-directional video content. In some embodiments, there may be a feedback mechanism between the content consumers and the decision engine 46 (e.g., either explicit or implicit based on user response). The received feedback may provide an additional vector for the decision engine 46 to choose appropriate region of interest for future content. For example, the feedback may be leveraged for personalized 2D content generation for specific content consumers based on their past experience. The feedback mechanism may also enable a negotiation scheme opportunity between the content generator and content consumer to identify a best region of interest. In some embodiments, the feedback mechanism may be policy controlled and/or configured.

The content generator 47 may include technology to generate one or more 2D videos based on the selected video information from the decision engine 46. The content generator 47 may also include technology to post processing the 2D frame (e.g., correcting for distortion, etc.) and to compress the one or more 2D videos (e.g., with a video encoder). The content distributor 48 may include technology to determine what type of content to distribute to a content consumer. For example, the content distributor 48 may include technology to determine one or more parameters related to the content consumer, and to select either the 360 video content or the one or more 2D videos for distribution to the content consumer based on the determined one or more parameters. In some embodiments, the content distributor 48 may also include technology to monitor the one or more parameters related to the content consumer, and dynamically switch between the 360 video content and the one or more 2D videos based on a change in the one or more parameters. In some embodiments, the parameters may be based on a policy and/or may be dynamically configurable. In some embodiments, machine learning may be applied to fine tune the parameters based on past history. For example, the one or more parameters may include a parameter related to one or more of a content consumer selection, prior information related to a content consumer, prior information related to a consumption device, a consumption device capability, bandwidth availability, a consumption device change, and an angle of view between a content consumer and a content consumption device. Some parameters may also be related to interactions between the content consumer and the content consumption device. For example, a representation of the full 360 video may be shown in a small browser window and users may drag a view area around the small window with a mouse to view different parts of the video. In some embodiments, the content distributer 48 may also include technology to distribute the 360 video content and/or the one or more 2D videos.

Embodiments of the data gatherer 45, the decision engine 46, the content generator 47, content distributor 48, and other components of the video generator apparatus 44, may be implemented in hardware, software, or any combination thereof. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Some embodiments may advantageously provide technology to create 2D versions of video from a 360 video for decoding and/or streaming efficiency. 360 videos may be available from a variety of sources including YOUTUBE, FACEBOOK, etc. For example, 360 video may refer to a panoramic video or omni-directional video, which can represent a sphere with a 360 degree by 180 degree representation. In general, a smaller viewport of the 360 video may be viewed by a viewer at a given time. The viewer may view such 360 videos with a head-mounted display (HMD) where the viewer may move their head to select the viewport. The viewer may also view 360 videos on a traditional display as a 2D window into the 360 video, optionally using their mouse, touch screen, keyboard, etc. to scroll to viewport regions that are off-screen.

360 videos may impact a decoder's performance, because a much larger region may be decoded than is viewed, resulting in increased decoding time or requiring more efficient/powerful decoders. 360 videos may also have an impact on streaming bandwidth (e.g., for streaming the encoded 360 video) and/or on hardware requirements (e.g., for transmitting a transcoded sub-section of a 360 frame to match the view of the user). As noted above, 360 videos are not always consumed in a 360 environment such as a HMD. A significant percentage of users may view the 360 videos casually on browser applications where the point of view being presented by the video player may be limited (e.g., with some other systems utilizing the same amount of compute/bandwidth resources as compared to encoding/decoding the 360 video for a HMD). Some 360 video formats may support metadata to add regions of interest (ROI) information to the content. For example, the ROI metadata may allow a content creator to indicate what they consider to be the most interesting viewpoints in the video at a given time. Video playback devices may then select the metadata-based ROIs for the viewer (e.g., or otherwise indicate the content-provider recommended ROIs to the viewer).

Some embodiments may advantageously generate 2D versions of the 360 video using the region of interest information to generate a 2D video and serve the 2D video to viewers consuming the content on 2D displays. Some embodiments may advantageously improve encoder/decoder performance, streaming bandwidth, and/or hardware requirements for a good viewing experience. For example, some embodiments may generate a 2D content from a 360 format by leveraging the available ROI information, thereby reducing bandwidth consumption as well as decoder cycles. Some embodiments may advantageously generate 2D videos for playback on 2D displays by extracting regions from 360 videos based upon aggregating the information from other viewers.

Some embodiments may include data gathering technology to gather ROI information on a given 360 video content that may obtained from the content generator, and/or multiple content consumers (e.g., based on the viewers' HMD/inertial tracking information). Based on the gathered ROIs, clustering technology may be utilized to select relevant frames for a 2D video from the given 360 content. Based on the content consumer needs/capability (e.g., 2D/3D availability), a content distribution server may select the 2D and/or 360 video for distribution along with an appropriate codec bit rate for streaming. Some embodiments may be utilized for either off-line encoding and/or on-the-fly encoding. For on-the-fly encoding, some embodiments may provide dynamic switching between the 2D and 360 formats based on multiple parameters such as user needs, bandwidth availability, consumption device change, etc. Some embodiments may be implemented on a server, a media accelerator, or other cloud arrangement that provides streaming media.

Figure 5:
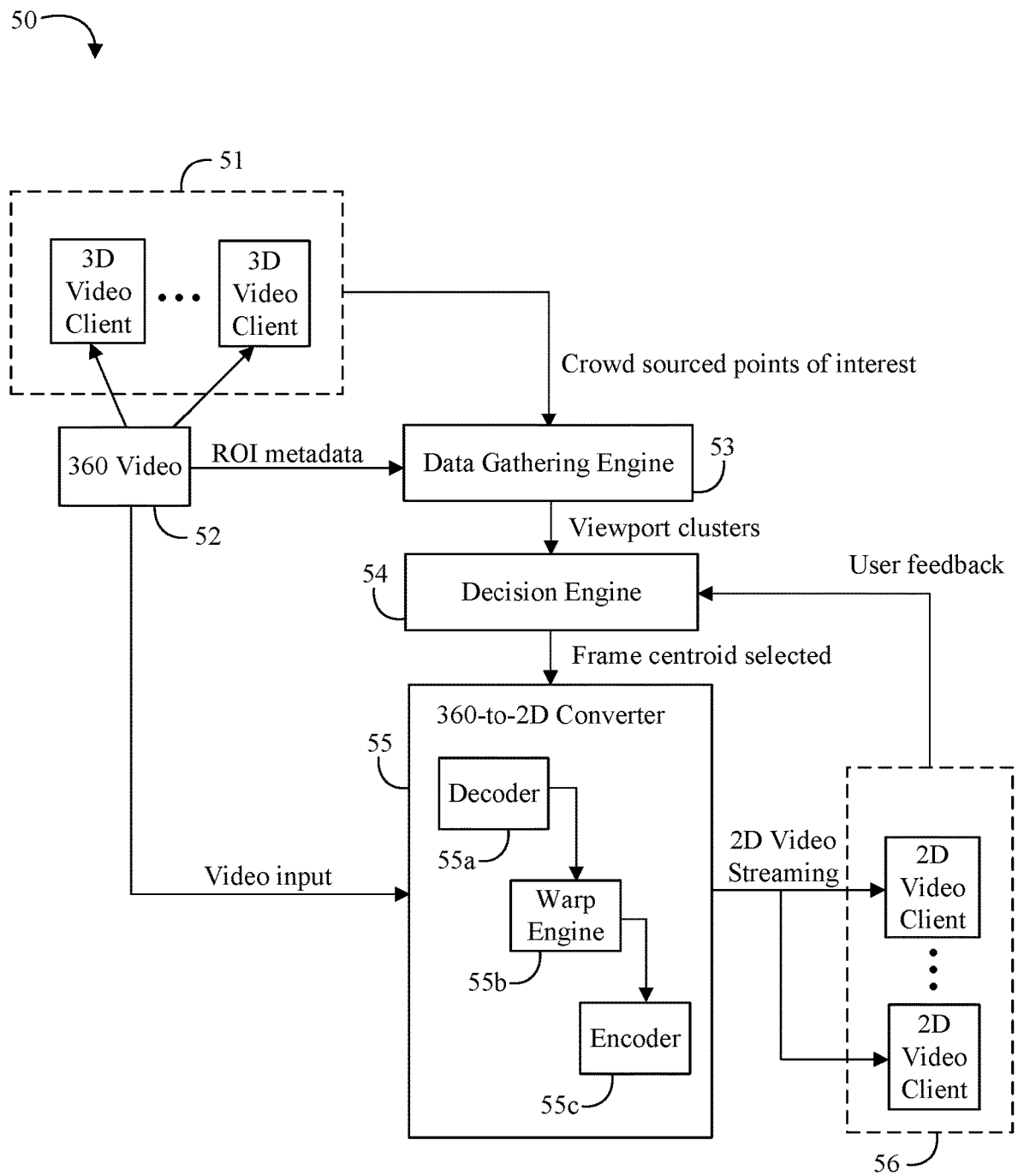
FIG. 5 is a block diagram of an example of a distributed video environment according to an embodiment.

Turning now to FIG. 5, an embodiment of a distributed video environment 50 may include one or more 360 video clients 51 consuming 360 video content 52. A data gathering engine 53 may gather information from the 360 video clients 51 and the 360 video content 52. For example, the 360 video content 52 may include ROI metadata. The 360 video clients 51 may provide crowd sourced points of interest to the data gathering engine 53. The data gathering engine 53 may then process the gathered information to provide viewport clusters to a decision engine 54. The decision engine 54 may utilize the information from the data gathering engine 53 together with user feedback to select a frame centroid. A 360-to-2D converter 55 may receive the 360 video content 52 and generate a 2D video from the 360 video content 52 based on the selected frame centroid from the decision engine 54. For example, the 360-to-2D converter 55 may include a warp engine 55b coupled between a decoder 55a and an encoder 55c. The 360-to-2D converter 55 may stream the 2D video to one or more 2D video clients 56. For example, the 2D video clients 56 may provide the user feedback to the decision engine 54. The user feedback may be explicit or may be implicit based on configuration/policies/etc.

Data Gathering Engine Examples

When viewing a 360 video, the user views only a portion of the 360 video, sometimes referred to as a viewport. For example, the user may select the viewport manually (e.g. with cursor keys, mouse movement, touch screen gestures such as swipes, etc.). With an appropriately configured headset, the user may select the viewport by moving their head or body (e.g., or with gestures or gaze tracking). For example, gaze tracking may further identify points of interest within the viewport. Whatever manner the user employs to select the viewport, the viewport information and/or points of interest information may subsequently be communicated to the content server as ROI information to process the 360 video and display that viewport to the user. The 360 video frame information may be projected to any of a variety of 2D frame formats including, for example, a fish eye format, an equirectangular projection (ERP) format, a truncated square pyramid (TSP) format, a cube-map format, and a packed cube-map format. When 360 video content is served to a HMD, for example, head position/rotation information and/or gaze tracking information of the user may be transmitted back to the server so the server can transmit the right section of the 360 frame to match the user's view.

Some embodiments may support a data gathering mode which may be enabled/disabled (e.g., by the user, an administrator, a content provider, a service provider, etc.). When data gathering is enabled, the content server may anonymously track how a 360 video is consumed in a 360 environment. For example, the tracked information may include the viewpoint that the user is interested in at a given time. Some amount of smoothing may be applied by the data gathering engine (e.g., or later in the process) to account for some jitter in the head motion. The smoothing may be based on a history of the rotation data, knowledge of the scene of the 360 video content, etc. For example, machine learning may help with the smoothing elements customized to a specific content generator or content consumer. If available, additional data points may also be gathered using embedded ROI metadata in the 360 video content for most popular viewpoints, director's viewpoints, etc. For example, additional weight may be given to the ROI metadata by the decision engine. An example of embedded ROI metadata is described in the Joint Collaborative Team on Video Coding (JCT-VC) document JCTVC-AA1005 entitled "HEVC Additional Supplemental Enhancement Information (Draft 2)," published May 16, 2017.

Figure 6:
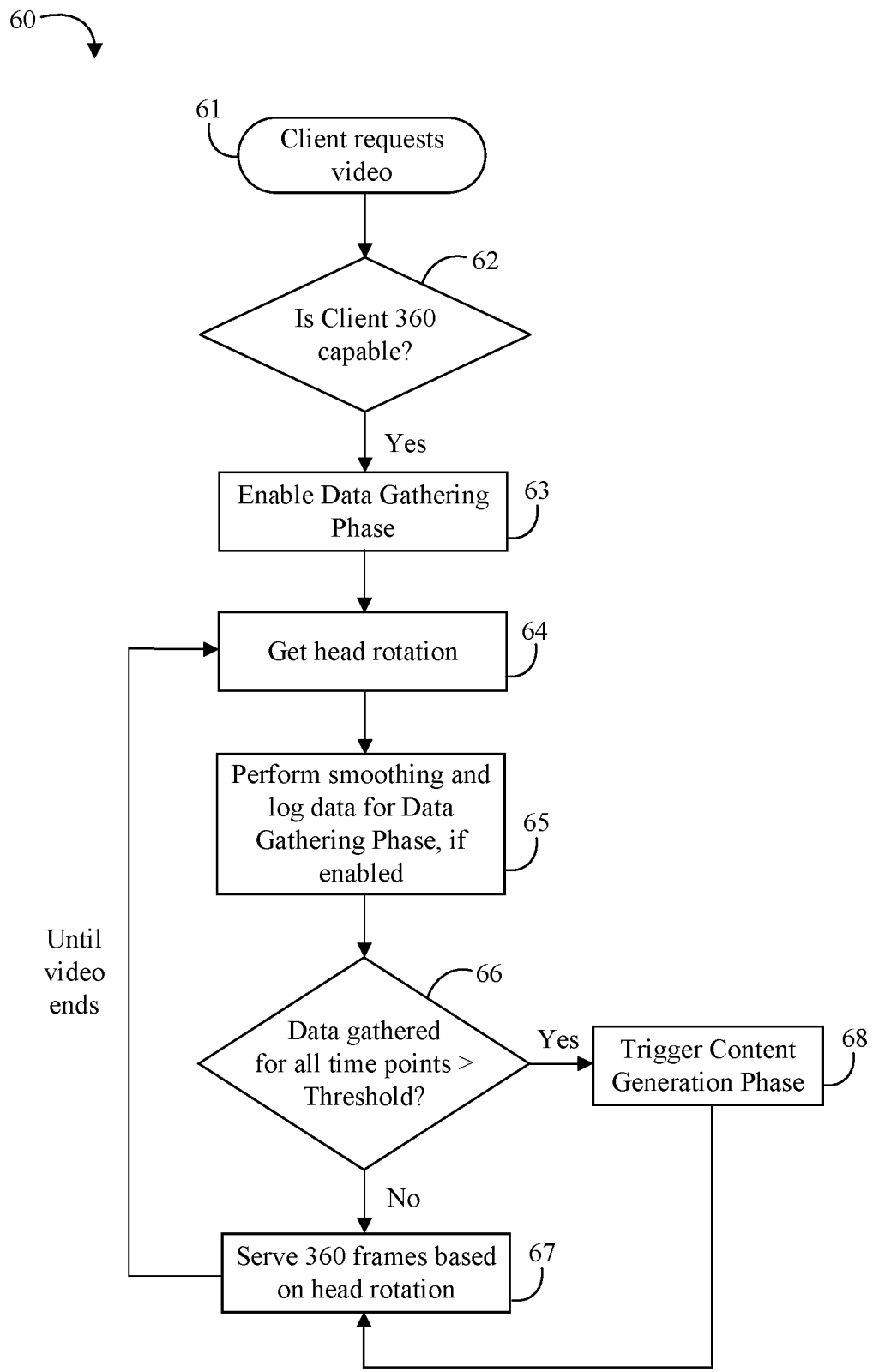
FIG. 6 is a flowchart of an example of a method of data gathering according to an embodiment.

Turning now to FIG. 6, an embodiment of a method 60 of data gathering may include a client requesting a video at block 61 and determining if the client is 360 capable at block 62. If the client is not 360 capable, no data gathering is performed. If the client is 360 capable, a data gathering phase may be enabled at block 63. The method 60 may then get eye/head position/rotation information at block 64, and then perform smoothing and log the data for the data gathering phase (e.g., if enabled) at block 65. If the data gathered for all time points is less than or equal to a threshold at block 66, the method 60 may continue to serve 360 frames based on the head rotation at block 67 and continue back to block 64 until the video ends. If the data gathered for all time points is greater than the threshold at block 66, the method 60 may trigger a content generation phase at block 68, and then continue to block 67 to continue serving the 360 frames until the video ends.

Decision Engine Examples

A decision engine may first determine when enough data has been gathered from a sufficient number of users for a sufficient number of time points in the 360 video to make further decisions about processing the 360 video and/or generating a 2D video from the 360 video. For example, the crowd sourced view data for each time point in the video and the ROI data may be processed by the decision engine to decide the best center point for a 2D frame generated for that time point. In absence of crowd sourced data points (e.g., such as during the beginning of a data gathering phase), ROI metadata may be used by the decision engine to decide on the center point for a frame (e.g., together with user feedback information from one or more 2D clients). In some embodiments, the decision engine may output one or more center points for 2D video frames to be generated out of the 360 video.

Figure 7:
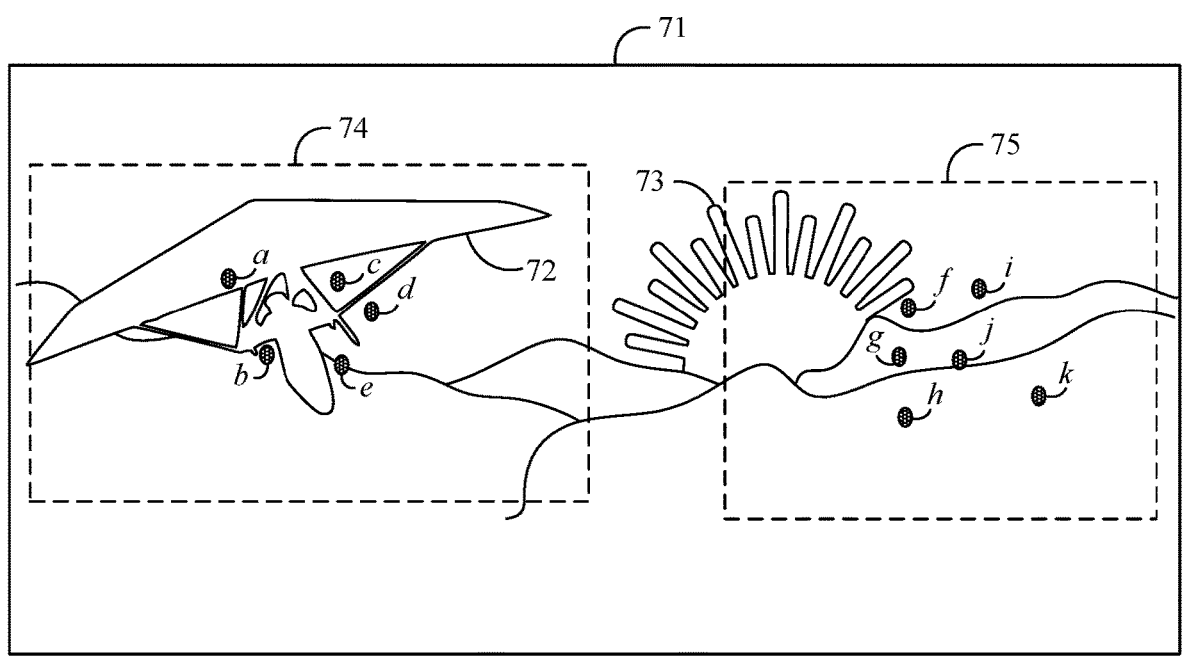
FIG. 7 is an illustrative diagram of an example of a omni-directional video frame according to an embodiment.

Turning now to FIG. 7, an embodiment of a 360 video frame 71 may include a scene with a hang glider 72 and a sunset 73. The content generator may include ROI metadata that corresponds to the scene in the frame 71 which indicates a first ROI 74 and a second ROI 75 (e.g., or the ROIs 74 and 75 may correspond to crowd sourced viewports/ROIs). The data gathering engine may have gathered crowd sourced points of interest a through e in the first ROI 74 around the hang glider 72, and crowd sourced points of interest f through k in the second ROI 75 around the sunset 73. For example, the view data per time point may be considered as a scatter plot of points that lie all over the X-Y plane (e.g., or X-Y-Z planes for 3D content). Some embodiments may group the points a through k into one or more clusters. When grouped, each cluster may be a possible candidate for a video frame for one of the generated 2D versions of the 360 video. For example, multiple candidates for the same time point may lead to multiple versions of the content. In some embodiments, the content server may offer a choice between the multiple versions to the content consumer or may auto-select one of the versions based on prior knowledge of the content consumer.

In some embodiments, the cluster formation may not be purely based on the view data. For example, at a certain time point, most users may have been looking at an interesting object at the edge of a view frame. Assuming that the view data is at the center of a cluster (thus centering the generated frame at this point) may lead to an incorrect frame appearance (e.g., because there may be a scene change beyond that point) and may cause the left and right halves of the frame to not match. To mitigate this, some embodiments may provide additional video analysis. For example, video analysis around a candidate cluster's center may reveal the problem mentioned above, which may be mitigated using different options such as splitting the candidate into two different candidate frames, choosing a different cluster center, and/or panning from one frame to the next or applying effects such as fade-in/fade-out to smooth the transition between frames.

In some embodiments, the decision engine may also sort out jitter in the generated 2D video. Given the number of recommended viewports, for example, when determining the centroid of a frame it may be possible that the centroid of one frame might not line up with the centroid of the next frame. This drift in the centroid of successive frames might also build up over time. When played out over time, the drift may result in jittery video for the end user. Advantageously, some embodiments of the decision engine may utilize a hysteresis over time to smooth out the centroid selection of successive frames so that the resultant generated frames appear smoother when played back. Additionally, or alternatively, some embodiments of the decision engine may receive feedback about jitter from the 2D clients that consume the generated 2D video and can apply that feedback to further refine the hysteresis and generated video.

2D Video Content Generation Examples

When the decision engine has decided on one or more center points for a frame for a particular timestamp, it may pass that info to a 360-to-2D converter. The 360-to-2D converter may include a 360 video decoder, a 2D encoder, and a warp engine to convert a 360 frame into a 2D frame. The 360-to-2D converter may take the original 360 video as input and may output a 2D encoded frame for a particular timestamp based on the center point data received from the decision engine. Some embodiments may generate one or several 2D videos (e.g., based on different view cluster/center selections) from the 360 video. As noted above, 360 frames may be represented through various formats that range from lossless (e.g., ERP) to lossy (e.g., TSP). Embodiments of the generated 2D video may be converted to a rectilinear projection format, or other suitable 2D video formats for better viewing on a 2D screen.

Figure 8:
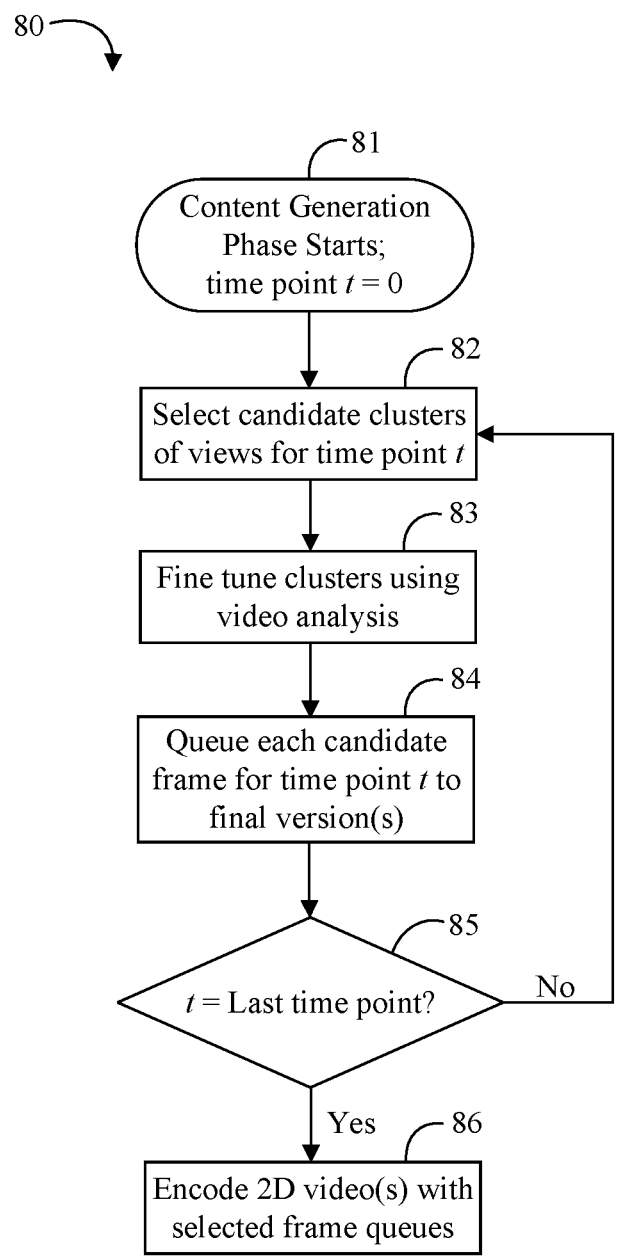
FIG. 8 is a flowchart of an example of a method of data gathering according to an embodiment.

Turning now to FIG. 8, an embodiment of a method 80 of generating 2D video content may include starting the content generation phase at a time point t=0 at block 81. The method 80 may then include selecting candidate clusters of views for time point t at block 82, fine tuning clusters using video analysis at block 83, and queueing each candidate frame for time t to final version(s) at block 84. If the time point t is not the last time point at block 85, the method 80 may return to block 82. If the time point t is the last time point at block 85, the method 80 may proceed to encoding the 2D video(s) with the selected frame queues at block 86.

Content Streaming Examples

When the content server detects a client that has no 360 viewing capability (such as a set-top box connected to a TV), it may select one of the generated 2D videos, if available, to stream to the client. The choice of which 2D version to play may be chosen based on various methods including, for example, a user interface option presented to the client, auto-selected based on knowledge of the client/user, detecting an angle of view of the user using mounted or built-in camera to track user position relative to the TV or monitor, and serving 2D content that makes for the best viewing angle. Some embodiments may advantageously provide lowered processing by not having to decode the 360 version. Even if the client device has minimal capability to view different sections of the 360 video (such as a browser with a mouse), for example, some embodiments may select an alternate frame in another 2D version of the 360 video instead of having to start decoding the 360 video. For example, the content generator may store enough metadata to map the 2D frames to the sub-section of the 360 video. In the worst case, if there is no matching 2D version that can provide an alternate frame, the content server may then fallback to decoding the 360 video starting at the required time point.

Figure 9:
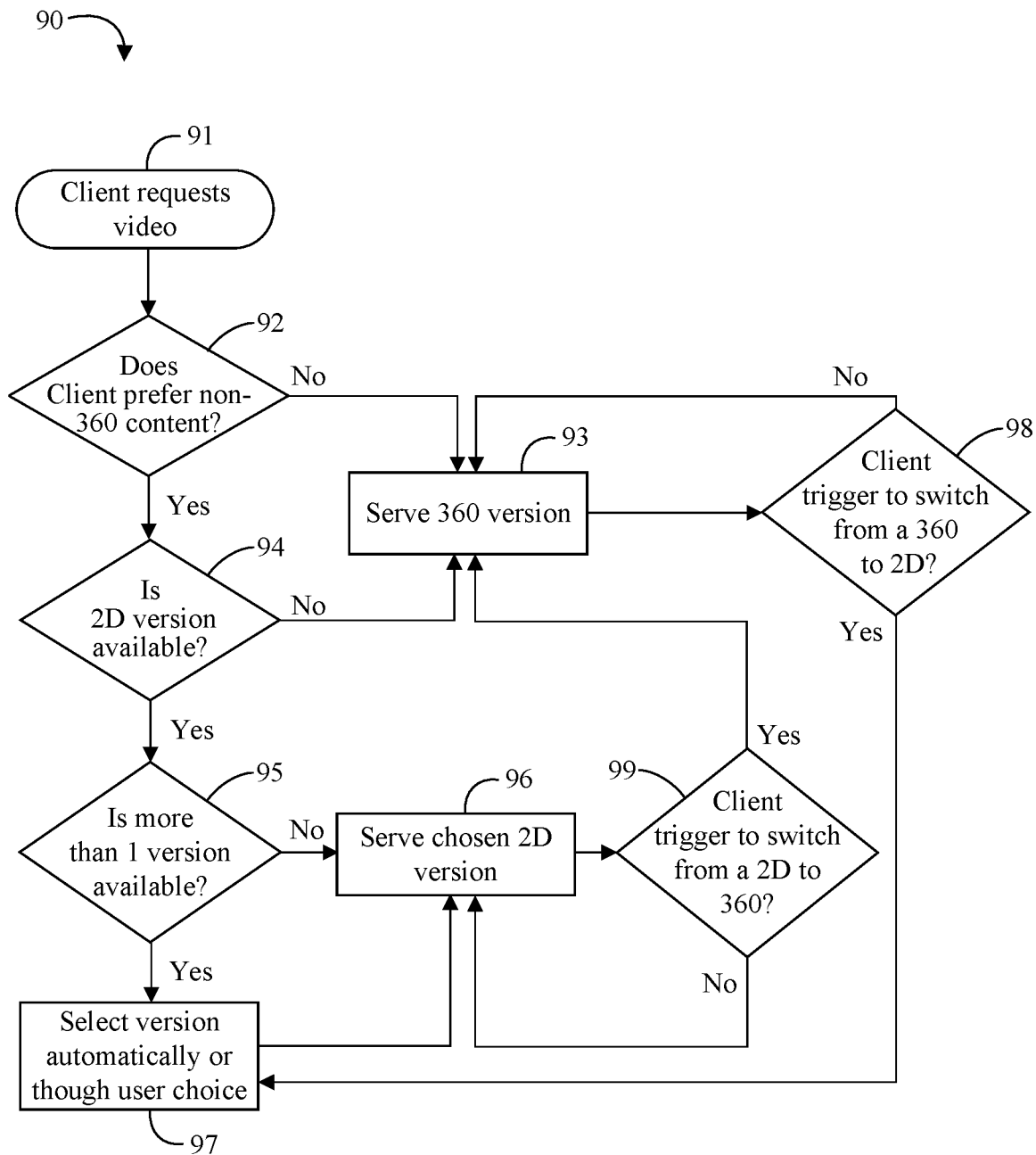
FIG. 9 is a flowchart of an example of a method of data gathering according to an embodiment.

Turning now to FIG. 9, an embodiment of a method 90 of streaming content may include a client requesting video content at block 91. The method 90 may determine if the client prefers non-360 content at block 92 and, if not, serve the 360 version of the video content at block 93. If the client is determined to prefer non-360 content at block 92 (e.g., or not be 360 capable), the method 90 may determine if 2D versions of the 360 video content are available at block 94. If not, the method 90 may serve the 360 version at block 93. If a 2D version is available at block 94, the method 90 may further determine if more than one version is available at block 95. If not, the method 90 may serve the available 2D version at block 96. Otherwise, the method 90 may select a version to serve at block 97 (e.g., automatically or through user choice) and then serve the selected version at block 96.

While serving the 360 version at block 93, the method 90 may determine if the client triggered a switch from 360 to 2D at block 98 and, if so, the method 90 may proceed to selecting a 2D version at block 97 and serving the 2D version at block 96. Otherwise the method 90 may continue serving the 360 version at block 93. While serving the 2D version at block 96, the method 90 may determine if the client triggered a switch from 2D to 360 at block 99 and, if so, the method 90 may proceed to serving the 360 version at block 93. Otherwise the method 90 may continue serving the 2D version at block 96.

Figure 10:
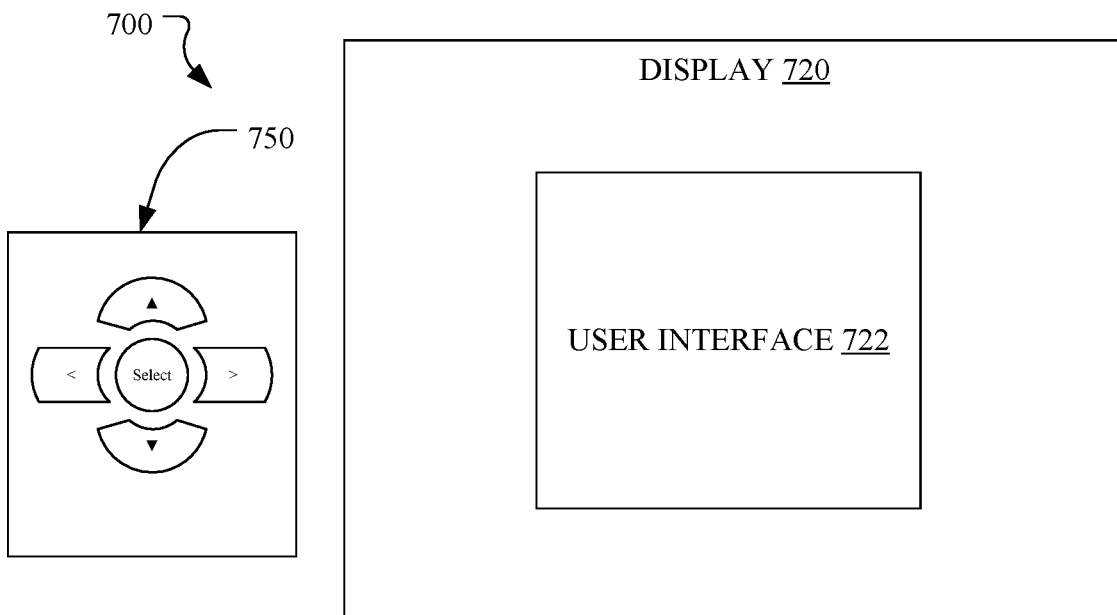
FIG. 10 is a block diagram of an example of a system having a navigation controller according to an embodiment.
Figure 10:
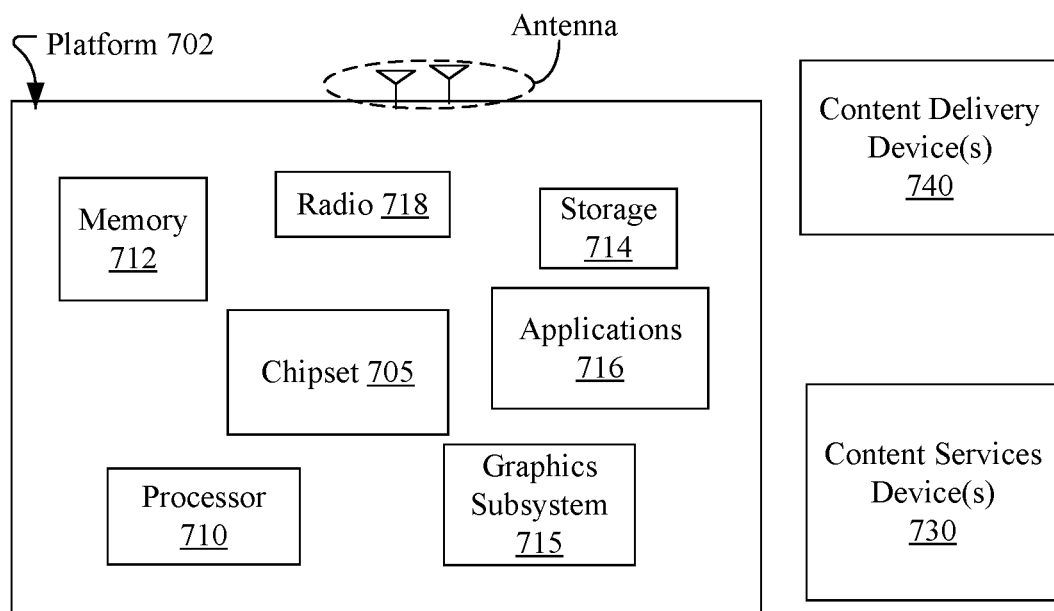

FIG. 10 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
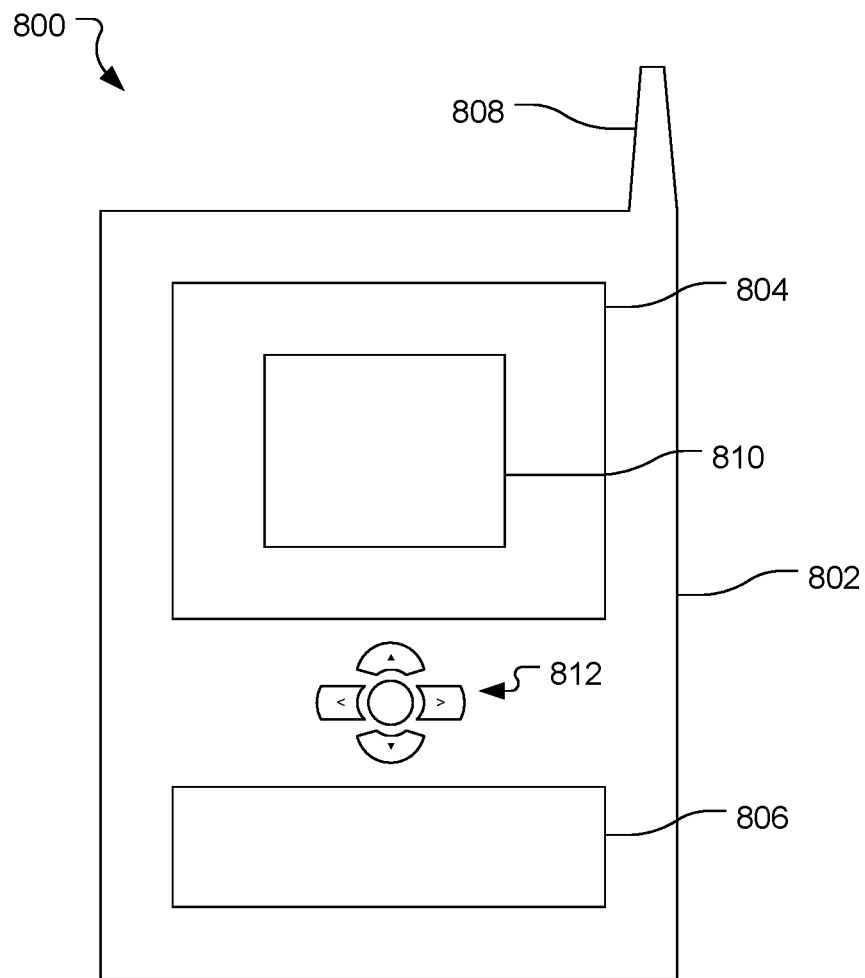
FIG. 11 is a block diagram of an example of a system having a small form factor according to an embodiment.

As described above, the system 700 may be embodied in varying physical styles or form factors. FIG. 11 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

In accordance with some embodiments, the system 700 and/or the device 800 may include technology for generating 2D video from 360 video content as described herein. In particular, the system 700 and/or device 800 may include one or more aspects of the below Examples.

ADDITIONAL NOTES AND EXAMPLES

Example 1 may include an electronic processing system, comprising a processor, memory communicatively coupled to the processor, and logic communicatively coupled to the processor to aggregate region of interest information for omni-directional video content from two or more sources, select video information from the omni-directional video content based on the aggregated region of interest information, and generate one or more two-dimensional videos based on the selected video information.

Example 2 may include the system of Example 1, wherein the logic is further to gather region of interest information from at least one of a content generator and a content consumer.

Example 3 may include the system of Example 1, wherein the logic is further to cluster the aggregated region of interest information to select the video information from the omni-directional video content.

Example 4 may include the system of any of Examples 1 to 3, wherein the logic is further to determine one or more parameters related to a content consumer, and select between the omni-directional video content and the one or more two-dimensional videos for distribution to the content consumer based on the determined one or more parameters.

Example 5 may include the system of Example 4, wherein the logic is further to monitor the one or more parameters related to the content consumer, and switch between the omni-directional video content and the one or more two-dimensional videos based on a change in the one or more parameters.

Example 6 may include the system of Example 5, wherein the one or more parameters includes a parameter related to one or more of a content consumer selection, prior information related to a content consumer, prior information related to a consumption device, a consumption device capability, bandwidth availability, a consumption device change, and an angle of view between a content consumer and a content consumption device.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to aggregate region of interest information for omni-directional video content from two or more sources, select video information from the omni-directional video content based on the aggregated region of interest information, and generate one or more two-dimensional videos based on the selected video information.

Example 8 may include the apparatus of Example 7, wherein the logic is further to gather region of interest information from at least one of a content generator and a content consumer.

Example 9 may include the apparatus of Example 7, wherein the logic is further to cluster the aggregated region of interest information to select the video information from the omni-directional video content.

Example 10 may include the apparatus of any of Examples 7 to 9, wherein the logic is further to determine one or more parameters related to a content consumer, and select between the omni-directional video content and the one or more two-dimensional videos for distribution to the content consumer based on the determined one or more parameters.

Example 11 may include the apparatus of Example 10, wherein the logic is further to monitor the one or more parameters related to the content consumer, and switch between the omni-directional video content and the one or more two-dimensional videos based on a change in the one or more parameters.

Example 12 may include the apparatus of Example 11, wherein the one or more parameters includes a parameter related to one or more of a content consumer selection, prior information related to a content consumer, prior information related to a consumption device, a consumption device capability, bandwidth availability, a consumption device change, and an angle of view between a content consumer and a content consumption device.

Example 13 may include a method of generating video, comprising aggregating region of interest information for omni-directional video content from two or more sources, selecting video information from the omni-directional video content based on the aggregated region of interest information, and generating one or more two-dimensional videos based on the selected video information.

Example 14 may include the method of Example 13, further comprising gathering region of interest information from at least one of a content generator and a content consumer.

Example 15 may include the method of Example 13, further comprising clustering the aggregated region of interest information to select the video information from the omni-directional video content.

Example 16 may include the method of any of Examples 13 to 15, further comprising determining one or more parameters related to a content consumer, and selecting between the omni-directional video content and the one or more two-dimensional videos for distribution to the content consumer based on the determined one or more parameters.

Example 17 may include the method of Example 16, further comprising monitoring the one or more parameters related to the content consumer, and switching between the omni-directional video content and the one or more two-dimensional videos based on a change in the one or more parameters.

Example 18 may include the method of Example 17, wherein the one or more parameters includes a parameter related to one or more of a content consumer selection, prior information related to a content consumer, prior information related to a consumption device, a consumption device capability, bandwidth availability, a consumption device change, and an angle of view between a content consumer and a content consumption device.

Example 19 may include at least one computer readable medium, comprising a set of instructions, which when executed by a computing device, cause the computing device to aggregate region of interest information for omni-directional video content from two or more sources, select video information from the omni-directional video content based on the aggregated region of interest information, and generate one or more two-dimensional videos based on the selected video information.

Example 20 may include the at least one computer readable medium of Example 19, comprising a further set of instructions, which when executed by the computing device, cause the computing device to gather region of interest information from at least one of a content generator and a content consumer.

Example 21 may include the at least one computer readable medium of Example 19, comprising a further set of instructions, which when executed by the computing device, cause the computing device to cluster the aggregated region of interest information to select the video information from the omni-directional video content.

Example 22 may include the at least one computer readable medium of any of Examples 19 to 21, comprising a further set of instructions, which when executed by the computing device, cause the computing device to determine one or more parameters related to a content consumer, and select between the omni-directional video content and the one or more two-dimensional videos for distribution to the content consumer based on the determined one or more parameters.

Example 23 may include the at least one computer readable medium of Example 22, comprising a further set of instructions, which when executed by the computing device, cause the computing device to monitor the one or more parameters related to the content consumer, and switch between the omni-directional video content and the one or more two-dimensional videos based on a change in the one or more parameters.

Example 24 may include the at least one computer readable medium of Example 23, wherein the one or more parameters includes a parameter related to one or more of a content consumer selection, prior information related to a content consumer, prior information related to a consumption device, a consumption device capability, bandwidth availability, a consumption device change, and an angle of view between a content consumer and a content consumption device.

Example 25 may include a video generator apparatus, comprising means for aggregating region of interest information for omni-directional video content from two or more sources, means for selecting video information from the omni-directional video content based on the aggregated region of interest information, and means for generating one or more two-dimensional videos based on the selected video information.

Example 26 may include the apparatus of Example 25, further comprising means for gathering region of interest information from at least one of a content generator and a content consumer.

Example 27 may include the apparatus of Example 25, further comprising means for clustering the aggregated region of interest information to select the video information from the omni-directional video content.

Example 28 may include the apparatus of any of Examples 25 to 27, further comprising means for determining one or more parameters related to a content consumer, and means for selecting between the omni-directional video content and the one or more two-dimensional videos for distribution to the content consumer based on the determined one or more parameters.

Example 29 may include the apparatus of Example 28, further comprising means for monitoring the one or more parameters related to the content consumer, and means for switching between the omni-directional video content and the one or more two-dimensional videos based on a change in the one or more parameters.

Example 30 may include the apparatus of Example 29, wherein the one or more parameters includes a parameter related to one or more of a content consumer selection, prior information related to a content consumer, prior information related to a consumption device, a consumption device capability, bandwidth availability, a consumption device change, and an angle of view between a content consumer and a content consumption device.

Example 31 may include a video generator apparatus, comprising a data gatherer including logic to aggregate region of interest information for 360 video content from two or more sources, a decision engine including logic to select video information from the 360 video content based on the aggregated region of interest information, and a content generator including logic to generate one or more two-dimensional videos based on the selected video information.

Example 32 may include the apparatus of Example 31, wherein the data gatherer includes further logic to gather region of interest information from at least one of a content generator and a content consumer.

Example 33 may include the apparatus of Example 31, wherein the data gatherer includes further logic to crowd source region of interest information from two or more content consumers.

Example 34 may include the apparatus of Example 33, wherein the data gatherer includes further logic to crowd source points of interest information from two or more content consumers.

Example 35 may include the apparatus of Example 31, wherein the decision engine includes further logic to cluster the aggregated region of interest information to select the video information from the 360 video content.

Example 36 may include the apparatus of Example 35, wherein the decision engine includes further logic to perform video analysis around a center of a candidate cluster, and process the cluster based on the video analysis to one or more of split the candidate into two different candidate frames, choose a different cluster center, pan from one frame to the next, and apply effects to smooth the transition between frames.

Example 37 may include the apparatus of Example 31, wherein the decision engine includes further logic to receive user feedback from one or more content consumers.

Example 38 may include the apparatus of Example 37, wherein the decision engine includes further logic to receive user feedback based on one or more of a configuration and a policy.

Example 39 may include the apparatus of Example 31, wherein the content generator includes further logic to compress the one or more two-dimensional videos with a video encoder.

Example 40 may include the apparatus of any of Examples 31 to 39, further comprising a content distributor including logic to determine one or more parameters related to a content consumer, and select between the 360 video content and the one or more two-dimensional videos for distribution to the content consumer based on the determined one or more parameters.

Example 41 may include the apparatus of Example 40, wherein the content distributor includes further logic to monitor the one or more parameters related to the content consumer, and switch between the 360 video content and the one or more two-dimensional videos based on a change in the one or more parameters.

Example 42 may include the apparatus of Example 41, wherein the one or more parameters are based on a policy.

Example 43 may include the apparatus of Example 41, wherein the one or more parameters are dynamically configurable.

Example 44 may include the apparatus of Example 41, wherein the one or more parameters includes a parameter related to one or more of a content consumer selection, prior information related to a content consumer, prior information related to a consumption device, a consumption device capability, bandwidth availability, a consumption device change, and an angle of view between a content consumer and a content consumption device.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor; and
logic communicatively coupled to the processor to:
gather point of interest information for omni-directional video content from two or more sources,
group the gathered point of interest information into one or more clusters,
select one or more candidate clusters from the one or more clusters,
select video information from the omni-directional video content based on the selected candidate clusters,
generate one or more two-dimensional videos based on the selected video information,
provide one or more viewport clusters to a machine learning decision engine,
select a frame centroid at the decision engine based on the one or more viewport clusters and user feedback, and
generate a two-dimensional video from the omni-directional video content based on the selected frame centroid from the decision engine.

2. The system of claim 1, wherein the logic is further to:
gather point of interest information from at least one content generator and at least one content consumer.

3. The system of claim 1, wherein the decision engine includes further logic to perform video analysis around a center of a candidate cluster, and process the cluster based on the video analysis to one or more of split the candidate into two different candidate frames, choose a different cluster center, pan from one frame to the next, and apply effects to smooth the transition between frames.

4. An electronic processing system, comprising:
a processor;
memory communicatively coupled to the processor; and
logic communicatively coupled to the processor to:
gather point of interest information for omni-directional video content from two or more sources;
group the gathered point of interest information into one or more clusters;
select one or more candidate clusters from the one or more clusters;
select video information from the omni-directional video content based on the selected candidate clusters;
generate one or more two-dimensional videos based on the selected video information;
select multiple candidate clusters from the one or more clusters at a respective time points;
fine tune one or more parameters of the selected multiple candidate clusters based on video analysis;
queue each candidate frame of the selected multiple candidate clusters at the respective time points; and
generate multiple versions of two-dimensional videos from the queued candidate frames for distribution to a content consumer.

5. The system of claim 4, wherein the logic is further to:
receive a request for video content from the content consumer;
determine if multiple versions of two-dimensional videos are available for the requested video content;
select one version of the available multiple versions of the two-dimensional videos; and serve the selected version of the two-dimensional videos to the content consumer.

6. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
gather point of interest information for omni-directional video content from two or more sources,
group the gathered point of interest information into one or more clusters,
select one or more candidate clusters from the one or more clusters,
select video information from the omni-directional video content based on the selected candidate clusters,
generate one or more two-dimensional videos based on the selected video information,
provide one or more viewport clusters to a machine learning decision engine,
select a frame centroid at the decision engine based on the one or more viewport clusters and user feedback, and
generate a two-dimensional video from the omni-directional video content based on the selected frame centroid from the decision engine.

7. The apparatus of claim 6, wherein the logic is further to:
gather point of interest information from at least one content generator and at least one content consumer.

8. The apparatus of claim 6, wherein the decision engine includes further logic to perform video analysis around a center of a candidate cluster, and process the cluster based on the video analysis to one or more of split the candidate into two different candidate frames, choose a different cluster center, pan from one frame to the next, and apply effects to smooth the transition between frames.

9. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
gather point of interest information for omni-directional video content from two or more sources;
group the gathered point of interest information into one or more clusters;
select one or more candidate clusters from the one or more clusters;
select video information from the omni-directional video content based on the selected candidate clusters;
generate one or more two-dimensional videos based on the selected video information;
select multiple candidate clusters from the one or more clusters at a respective time points;
fine tune one or more parameters of the selected multiple candidate clusters based on video analysis;
queue each candidate frame of the selected multiple candidate clusters at the respective time points; and
generate multiple versions of two-dimensional videos from the queued candidate frames for distribution to a content consumer.

10. The apparatus of claim 9, wherein the logic is further to:
receive a request for video content from the content consumer;
determine if multiple versions of two-dimensional videos are available for the requested video content;
select one version of the available multiple versions of the two-dimensional videos; and
serve the selected version of the two-dimensional videos to the content consumer.

11. A method of generating video, comprising:
gathering point of interest information for omni-directional video content from two or more sources;
grouping the gathered point of interest information into one or more clusters;
selecting one or more candidate clusters from the one or more clusters;
selecting video information from the omni-directional video content based on the selected candidate clusters;
generating one or more two-dimensional videos based on the selected video information;
providing one or more viewport clusters to a machine learning decision engine;
selecting a frame centroid at the decision engine based on the one or more viewport clusters and user feedback; and
generating a two-dimensional video from the omni-directional video content based on the selected frame centroid from the decision engine.

12. The method of claim 11, further comprising:
gathering point of interest information from at least one content generator and at least one content consumer.

13. The method of claim 11, further comprising:
performing video analysis around a center of a candidate cluster; and
processing the cluster based on the video analysis to one or more of split the candidate into two different candidate frames, choose a different cluster center, pan from one frame to the next, and apply effects to smooth the transition between frames.

14. A method of generating video, comprising:
gathering point of interest information for omni-directional video content from two or more sources;
grouping the gathered point of interest information into one or more clusters;
selecting one or more candidate clusters from the one or more clusters;
selecting video information from the omni-directional video content based on the selected candidate clusters;
generating one or more two-dimensional videos based on the selected video information;
selecting multiple candidate clusters from the one or more clusters at a respective time points;
fine tuning one or more parameters of the selected multiple candidate clusters based on video analysis;
queueing each candidate frame of the selected multiple candidate clusters at the respective time points; and
generating multiple versions of two-dimensional videos from the queued candidate frames for distribution to a content consumer.

15. The method of claim 14, further comprising:
receiving a request for video content from the content consumer;
determining if multiple versions of two-dimensional videos are available for the requested video content;
selecting one version of the available multiple versions of the two-dimensional videos; and
serving the selected version of the two-dimensional videos to the content consumer.

16. At least one non-transitory computer readable medium, comprising a set of instructions, which when executed by a computing device, cause the computing device to:
- gather point of interest information for omni-directional video content from two or more sources;
- group the gathered point of interest information into one or more clusters;
- select one or more candidate clusters from the one or more clusters;
- select video information from the omni-directional video content based on the selected candidate clusters;
- generate one or more two-dimensional videos based on the selected video information;
- provide one or more viewport clusters to a machine learning decision engine;
- select a frame centroid at the decision engine based on the one or more viewport clusters and user feedback; and
- generate a two-dimensional video from the omni-directional video content based on the selected frame centroid from the decision engine.

17. The at least one non-transitory computer readable medium of claim 16, comprising a further set of instructions, which when executed by the computing device, cause the computing device to:
- gather point of interest information from at least one content generator and at least one content consumer.

18. The at least one non-transitory computer readable medium of claim 16, comprising a further set of instructions, which when executed by the computing device, cause the computing device to:
- perform video analysis around a center of a candidate cluster; and
- process the cluster based on the video analysis to one or more of split the candidate into two different candidate frames, choose a different cluster center, pan from one frame to the next, and apply effects to smooth the transition between frames.

19. At least one non-transitory computer readable medium, comprising a set of instructions, which when executed by a computing device, cause the computing device to:
- gather point of interest information for omni-directional video content from two or more sources;
- group the gathered point of interest information into one or more clusters;
- select one or more candidate clusters from the one or more clusters;
- select video information from the omni-directional video content based on the selected candidate clusters;
- generate one or more two-dimensional videos based on the selected video information;
- select multiple candidate clusters from the one or more clusters at a respective time points;
- fine tune one or more parameters of the selected multiple candidate clusters based on video analysis;
- queue each candidate frame of the selected multiple candidate clusters at the respective time points; and
- generate multiple versions of two-dimensional videos from the queued candidate frames for distribution to a content consumer.

20. The at least one non-transitory computer readable medium of claim 19, comprising a further set of instructions, which when executed by the computing device, cause the computing device to:
- receive a request for video content from the content consumer;
- determine if multiple versions of two-dimensional videos are available for the requested video content;
- select one version of the available multiple versions of the two-dimensional videos; and
- serve the selected version of the two-dimensional videos to the content consumer.

\* \* \* \* \*